United States Patent
Kawakami et al.

(10) Patent No.: US 12,195,604 B2
(45) Date of Patent: *Jan. 14, 2025

(54) THERMALLY CONDUCTIVE MATERIAL AND WIRING HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Takashi Kawakami, Mie (JP); Kazuo Nakashima, Mie (JP); Yusaku Maeda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 115 days.

This patent is subject to a terminal disclaimer.

(21) Appl. No.: 17/795,379

(22) PCT Filed: Jan. 25, 2021

(86) PCT No.: PCT/JP2021/002414
§ 371 (c)(1),
(2) Date: Jul. 26, 2022

(87) PCT Pub. No.: WO2021/161764
PCT Pub. Date: Aug. 19, 2021

(65) Prior Publication Data
US 2023/0093307 A1 Mar. 23, 2023

(30) Foreign Application Priority Data
Feb. 10, 2020 (JP) .................... 2020-020506

(51) Int. Cl.
*C08K 3/04* (2006.01)
*C08K 7/06* (2006.01)
(Continued)

(52) U.S. Cl.
CPC ............... *C08K 3/04* (2013.01); *C08K 7/06* (2013.01); *C08K 7/28* (2013.01); *H01B 7/42* (2013.01);
(Continued)

(58) Field of Classification Search
CPC ............. C08K 3/04; C08K 7/06; C08K 7/28; C08K 2003/2227; C08K 2201/001; C08K 7/24;
(Continued)

(56) References Cited

U.S. PATENT DOCUMENTS

2012/0305308 A1* 12/2012 Toyama ............... H02G 3/0481
174/70 R
2013/0116353 A1* 5/2013 Jang ........................ C08L 23/12
521/134
(Continued)

FOREIGN PATENT DOCUMENTS

CN 109181134 A 1/2019
CN 109206849 A 1/2019
(Continued)

OTHER PUBLICATIONS

Ehrenreich, L. and Katz, H.S., "Glass Fillers", Additives for Plastics, vol. 2, pp. 17-24 (1978) (Year: 1978).*
(Continued)

*Primary Examiner* — Mark Kopec
*Assistant Examiner* — Jaison P Thomas
(74) *Attorney, Agent, or Firm* — Venjuris, P.C.

(57) ABSTRACT

A thermally conductive material contains a base resin and a filler, the filler contains a thermally conductive filler and a hollow filler composed of particles including a gas layer, a
(Continued)

content of the filler is 20.0% by volume or more and 90.0% by volume or less based on a total material amount, and a content of the hollow filler is 25.0% by volume or more and 70.0% by volume or less based on a total amount of the filler. A wiring harness is provided with an insulated wire composed of an insulation coating and a conductor, an exterior material, the insulated wire being inserted in the exterior material, and a heat dissipation material to be arranged between the insulated wire and the exterior material, and the heat dissipation material is made of the thermally conductive material.

15 Claims, 4 Drawing Sheets

(51) Int. Cl.
*C08K 7/28* (2006.01)
*H01B 7/42* (2006.01)
*C08K 3/22* (2006.01)

(52) U.S. Cl.
CPC ............ *C08K 2003/2227* (2013.01); *C08K 2201/001* (2013.01)

(58) Field of Classification Search
CPC ...... C08K 2003/2296; C08K 2201/005; H01B 7/42; H01B 7/0045; C08L 83/04; C08L 101/00; C09K 5/14; B60R 16/0207
See application file for complete search history.

(56) References Cited

U.S. PATENT DOCUMENTS

| | | | |
|---|---|---|---|
| 2015/0183951 A1* | 7/2015 | Bhagwagar | C09J 183/14 |
| | | | 524/430 |
| 2018/0065392 A1* | 3/2018 | Wu | C08K 3/013 |
| 2019/0367791 A1* | 12/2019 | Kim | C08J 9/32 |
| 2020/0022291 A1 | 1/2020 | Matsuzaki et al. | |
| 2020/0098663 A1 | 3/2020 | Sugiyama et al. | |

FOREIGN PATENT DOCUMENTS

| | | |
|---|---|---|
| JP | H06-252572 A | 9/1994 |
| JP | 2004-315761 A | 11/2004 |
| JP | 2007-112843 A | 5/2007 |

OTHER PUBLICATIONS

International Search Report issued on Apr. 27, 2021 for WO 2021/161764 A1 (6 pages).

* cited by examiner

THERMALLY CONDUCTIVE MATERIAL AND WIRING HARNESS

CROSS REFERENCE TO RELATED APPLICATIONS

This application is a national phase of PCT application No. PCT/JP2021/002414, filed on 25 Jan. 2021, which claims priority from Japanese patent application No. 2020-020506, filed on 10 Feb. 2020, all of which are incorporated herein by reference.

TECHNICAL FIELD

The present disclosure relates to a thermally conductive material and a wiring harness.

BACKGROUND

In an electric vehicle, a power control unit (PCU) and a battery are connected by a high voltage cable. Since a large current flows in the high voltage cable, the high voltage cable has a large conductor diameter. However, if the conductor diameter of the high voltage cable is large, problems such as an increased weight, reduced bendability and a wiring space occur. Thus, there is a demand for reducing the conductor diameter of the high voltage cable. On the other hand, if the conductor diameter of the high voltage cable is reduced, a temperature largely increases due to Joule heat in the high voltage cable in which a large current flows. Thus, it is necessary to ensure heat dissipation.

For example, Patent Document 1 discloses a wiring harness provided with a wire, a protecting tube member disposed outside the wire to have the wire inserted therethrough, and a heat transfer member made of metal and directly or indirectly held in contact with the inner surface of the protecting tube member. According to the wiring harness of Patent Document 1, heat generated by the wire is transferred to the protecting tube member by the heat transfer member and dissipated to outside from the protecting tube member.

PRIOR ART DOCUMENT

Patent Document

Patent Document 1: JP 2011-165354 A

SUMMARY OF THE INVENTION

Problems to be Solved

However, in the wiring harness of Patent Document 1, the heat transfer member is made of metal and, if the heat transfer member is disposed to enclose the wire entirely in a wire extending direction to efficiently transfer heat to the protecting tube member, a weight increase is unavoidable. Thus, the wiring harness of Patent Document 1 has not been sufficient in terms of heat dissipation and weight saving.

A problem to be solved by the present disclosure is to provide a thermally conductive material and a wiring harness capable of combining heat dissipation and weight saving.

Means to Solve the Problem

The present disclosure is directed to a thermally conductive material containing a base resin and a filler, wherein the filler contains a thermally conductive filler and a hollow filler composed of particles including a gas layer, a content of the filler is 20.0% by volume or more and 90.0% by volume or less based on a total material amount, and a content of the hollow filler is 25.0% by volume or more and 70.0% by volume or less based on a total amount of the filler.

The present disclosure is also directed to a wiring harness with an insulated wire composed of an insulation coating and a conductor, an exterior material, the insulated wire being inserted in the exterior material, and a heat dissipation material to be arranged between the insulated wire and the exterior material, the heat dissipation material being made of the thermally conductive material according to the present disclosure.

Effect of the Invention

According to the thermally conductive material of the present disclosure, heat dissipation and weight saving can be combined.

DETAILED DESCRIPTION TO EXECUTE THE INVENTION

Description of Embodiments of Present Disclosure

First, embodiments of the present disclosure are listed and described.

(1) The thermally conductive material according to the present disclosure contains a base resin and a filler, wherein the filler contains a thermally conductive filler and a hollow filler composed of particles including a gas layer, a content of the filler is 20.0% by volume or more and 90.0% by volume or less based on a total material amount, and a content of the hollow filler is 25.0% by volume or more and 70.0% by volume or less based on a total amount of the filler. The thermally conductive material of the present disclosure contains the hollow filler, whereby the gas layers are formed in the thermally conductive material. Thus, a specific weight of the thermally conductive material can be reduced. Further, by containing the hollow filler in the thermally conductive material, the thermally conductive filler is concentrated in the base resin between the particles of the hollow filler. Thus, particles of the thermally conductive filler are easily linked and heat conduction paths are easily formed. Therefore, heat dissipation and weight saving can be combined.

(2) The thermally conductive filler may contain a fibrous filler. This is because particles of the fibrous fiber are oriented and easily linked to each other in the base resin between the particles of the hollow filler, and heat conduction paths are more easily formed.

(3) The thermally conductive filler may contain a fibrous filler and a particulate filler. This is because the heat conduction paths are more easily formed by linking the particles of the fibrous fiber oriented in the base resin by the particulate filler to each other.

(4) The fibrous filler may be a carbon fiber. This is because the carbon fiber is a material having a high thermal conductivity rate and contributes to an improvement in thermal conductivity.

(5) A fiber length of the fibrous filler may be 50 μm or more and 300 μm or less. This is because the heat conduction paths are more easily formed.

(6) The particulate filler may be composed of alumina particles. This is because the alumina particles are materials having a high thermal conductivity rate and contribute to an improvement in thermal conductivity.

(7) The hollow filler may be composed of glass particles including a gas layer. The glass particles are excellent in strength and excellent in an effect of maintaining the gas layers in the thermally conductive material.

(8) The hollow filler may have a spherical shape. This is because the spherical shape is excellent in strength and excellent in the effect of maintaining the gas layers in the thermally conductive material.

(9) A median diameter d50 of the hollow filler may be 15 μm or more and 90 μm or less. This is because the thermally conductive filler is appropriately dispersed in the base resin between the particles of the hollow filler.

(10) The wiring harness of the present disclosure is provided with an insulated wire composed of an insulation coating and a conductor, an exterior material, the insulated wire being inserted in the exterior material, and a heat dissipation material to be arranged between the insulated wire and the exterior material, the heat dissipation material being made of the thermally conductive material according to the present disclosure. Since the heat dissipation material to be arranged between the insulated wire and the exterior material is made of the thermally conductive material according to the present disclosure in the wiring harness of the present disclosure, heat dissipation and weight saving can be combined.

(11) The wiring harness according to the present disclosure may be used as a high voltage cable for connecting between a power control unit and a battery. This is because heat dissipation and weight saving can be combined.

(12) The high voltage cable may be for an electric vehicle. This is because heat dissipation and weight saving can be combined.

Details of Embodiment of Present Disclosure

Specific examples of a thermally conductive material of the present disclosure and a wiring harness of the present disclosure are described below with reference to the drawings. Note that the present disclosure is not limited to these illustrations.

The thermally conductive material according to the present disclosure contains a base resin and a filler, wherein the filler contains a thermally conductive filler and a hollow filler composed of particles including a gas layer, a content of the filler is 20.0% by volume or more and 90.0% by volume or less based on a total material amount, and a content of the hollow filler is 25.0% by volume or more and 70.0% by volume or less based on a total amount of the filler. The filler may be electrically conductive (non-insulative) or may be electrically nonconductive (insulative). Insulation means electrical insulation and means that an electrical resistivity is very high ($10^6$ Ω·m or more).

The base resin is not particularly limited. The base resin may be a thermoplastic resin or a thermosetting resin. Out of these, the thermosetting resin is more preferable in terms of better heat resistance. Examples of the base resin include a silicone resin, an epoxy resin, a polyimide resin, a bismaleimide resin, a benzocyclobutene resin, a phenol resin, an unsaturated polyester resin, a diallyl phthalate resin and a urethane resin. These may be singly used as the base resin or two or more kinds of these may be used in combination. Out of these, the silicone resin is more preferable in terms of excellent heat resistance, excellent moldability and excellent dimensional stability.

An inorganic filler can be cited as the thermally conductive filler. The inorganic filler may be electrically conductive (non-insulative) or may be electrically nonconductive (insulative). The inorganic filler is not particularly limited, but preferably has an electrical resistivity of 1.00 W/m·K or more, more preferably an electrical resistivity of 20.00 W/m·K or more and even more preferably an electrical resistivity of 30.00 W/m·K or more, in terms of improving thermal conductivity and the like. Examples of the insulating inorganic filler excellent in thermal conductivity include metal particles of aluminum, gold, copper and the like, carbon materials such as black lead, graphite and carbon fibers, aluminum oxide (alumina), aluminum hydroxide, magnesium hydroxide, magnesium oxide, talc, boehmite, boron nitride, aluminum nitride, silicon nitride and silicon carbide. These may be singly used as the thermally conductive filler or two or more kinds of these may be used in combination.

The shape of the thermally conductive filler is not particularly limited. Examples of the shape of the thermally conductive filler include fibrous shapes, particulate shapes, needle-like shapes, flat shapes and scaly shapes. The particulate shapes include one or two or more kinds selected from a group composed of indefinite shapes, spherical shapes and oval spherical shapes. The particulate shapes including only spherical shapes are preferable. The fibrous shapes and the needle-like shapes are not particularly distinguished, but thinner shapes having a relatively short minor axis length may be defined as the fibrous shapes and thicker shapes having a relatively long minor axis length may be defined as the needle-like shapes.

The thermally conductive filler may contain a fibrous filler. This is because particles of the fibrous filler are oriented and linked to each other in the base resin between particles of the hollow filler, and heat condition paths are more easily formed. Further, the thermally conductive filler may contain a fibrous filler and a particulate filler. This is because the heat condition paths are more easily formed by linking particles of the fibrous filler oriented in the base resin to each other. The fibrous filler may be a carbon fiber. This is because the carbon fiber is a material having a high thermal conduction rate and contributes to an improvement in thermal conduction. The particulate filler may be composed of alumina particles. This is because the alumina particles are materials having a high thermal conduction rate and contribute to an improvement in thermal conduction. Further, the alumina particles are spherical particles.

A fiber length (major axis length) of the fibrous filler is not particularly limited, but may be 50 μm or more and 300 μm or less. If the fiber length of the fibrous filler is 50 μm or more, heat conduction paths by the fibrous filler are more easily formed. Further, from this perspective, the fiber length of the fibrous filler is more preferably 70 μm or more, even more preferably 100 μm or more. If the fiber length of the fibrous filler is 300 μm or less, the strength of the fibrous filler is easily ensured. Further, the heat conduction paths by the fibrous filler are more easily formed per unit volume. Further, from this perspective, the fiber length of the fibrous filler is more preferably 250 μm or less, even more preferably 200 μm or less. The fiber length of the fibrous filler can be measured by a microscope, a scanning electron microscope (SEM), a particle size distribution meter or the like. The fiber length of the fibrous filler may be expressed by an arithmetic average value of fiber lengths of the fibrous filler to be measured.

A fiber diameter (minor axis length) of the fibrous filler is not particularly limited, but may be 5 μm or more and 20 μm or less. If the fiber diameter of the fibrous filler is 5 μm or more, the strength of the fibrous filler is easily ensured. Further, from this perspective, the fiber diameter of the fibrous filler is more preferably 7 μm or more, even more preferably 10 μm or more. If the fiber diameter of the fibrous filler is 20 μm or less, the heat conduction paths by the fibrous filler are more easily formed per unit volume. Further, from this perspective, the fiber diameter of the fibrous filler is more preferably 17 μm or less, even more preferably 15 μm or less. The fiber diameter of the fibrous filler can be measured by a microscope, a scanning electron microscope (SEM), a particle size distribution meter or the like. The fiber diameter of the fibrous filler may be expressed by an arithmetic average value of fiber diameters of the fibrous filler to be measured.

An aspect ratio (major axis length/minor axis length) of the fibrous filler is not particularly limited, but preferably 8 or more, more preferably 9 or more and 30 or less. If the aspect ratio of the fibrous filler is less than 8, an effect of forming the heat conduction paths by the fibrous filler tends to be reduced.

The hollow filler is composed of particles including a gas layer. Including a gas layer means to include a gas layer in a closed part in the hollow filler. Since porous bodies include gas layers in unclosed parts, the porous bodies do not fall under the hollow filler in the present disclosure. The hollow filler has a structure having a gas layer inside a closed shell, and a core shell structure and a microsphere structure can be cited as the structure of the hollow filler.

Glass, resin and the like can be cited as a material constituting the shell of the hollow filler. A thermoplastic resin and a thermosetting resin can be cited as the resin. Glass is good as the material constituting the shell of the hollow filler in terms of excellent strength and an excellent effect of maintaining gas layers in the thermally conductive material. That is, the hollow filler may be composed of glass particles including a gas layer. The gas layers of the hollow filler may be air, inert gas such as nitrogen or argon, hydrocarbon gas or the like. For example, if the material constituting the shell of the hollow filler is a thermoplastic resin and the gas layers of the hollow filler are hydrocarbon gas, the shell of the hollow filler expands and can be adjusted to have a desired foaming magnification.

The shape of the hollow filler is not particularly limited. Spherical shapes and oval spherical shapes can be cited as the shape of the hollow filler. The hollow filler may have a spherical shape. This is because the spherical shape is excellent in strength and excellent in an effect of maintaining the gas layers in the thermally conductive material.

A medium diameter d50 of the hollow filler may be 15 μm or more and 90 μm or less. This is because the thermally conductive filler is appropriately dispersed in the base resin between the particles of the hollow filler. Further, the medium diameter d50 of the hollow filler is more preferably 30 μm or more and 80 μm or less, even more preferably 50 μm or more and 80 μm or less.

In the thermally conductive material, the filler may be composed only of the thermally conductive filler and the hollow filler or may contain another filler.

In the thermally conductive material, the content of the filler is 20.0% by volume or more and 90.0% by volume or less based on the total material amount, and the content of the hollow filler is 25.0% by volume or more and 70.0% by volume or less based on the total amount of the filler. By such a blending balance, a low specific weight and a high thermal conductivity rate can be realized in a well-balanced manner. If the content of the filler is more than 90.0% by volume based on the total material amount in the thermally conductive material, the thermally conductive material is brittle and not suitable as a heat dissipation material for automotive vehicle.

In the thermally conductive material, the content of the filler is more preferably 25.0% by volume or more and 85.0% by volume or less, even more preferably 30.0% by volume or more and 80.0% by volume or less based on the total material amount. Further, in the thermally conductive material, the content of the hollow filler is more preferably 30.0% by volume or more and 65.0% by volume or less, even more preferably 35.0% by volume or more and 60.0% by volume or less based on the total amount of the filler. Further, in the thermally conductive material, the content of the thermally conductive filler is preferably 30.0% by volume or more and 75.0% by volume or less, more preferably 35.0% by volume or more and 70.0% by volume or less, even more preferably 40.0% by volume or more and 65.0% by volume or less based on the total amount of the filler.

In the thermally conductive material, the content of the thermally conductive filler is preferably 20.0% by volume or more and 60.0% by volume or less based on the total material amount. The content of the thermally conductive filler is more preferably 25.0% by volume or more and 60.0% by volume or less, even more preferably 30.0% by volume or more and 60.0% by volume or less based on the total material amount. If the content of the thermally conductive filler is 20.0% by volume or more based on the total material amount, the thermal conductivity rate of the thermally conductive filler is better. Further, if the content of the thermally conductive filler is 30.0% by volume or more based on the total material amount, the thermal conductivity rate of the thermally conductive material is particularly good. If the content of the thermally conductive filler is 60.0% by volume or less based on the total material amount, the strength of the thermally conductive material is easily ensured.

In the thermally conductive material, the content of the hollow filler is preferably 20.0% by volume or more and 60.0% by volume or less based on the total material amount. If the content of the hollow filler is 20.0% by volume or more based on the total material amount, a specific weight of the thermally conductive material is easily reduced. If the content of the hollow filler is 60.0% by volume or less based on the total material amount, the strength of the thermally conductive material is easily ensured.

The specific weight of the thermally conductive material is preferably below 1.50, more preferably 1.40 or less, even more preferably 1.30 or less. Further, the thermal conductivity rate of the thermally conductive material is preferably 0.50 W/m·K or more, more preferably 0.80 W/m·K or more, even more preferably 1.00 W/m·K or more. The specific weight of the thermally conductive material can be measured in accordance with JIS K5400. The thermal conductivity rate of the thermally conductive material can be measured by a heat flow meter method in accordance with JIS A1412.

The thermally conductive material of the present disclosure may contain or may not contain an additive and the like to be added to the base resin, in addition to the base resin and the filler.

According to the thermally conductive material of the present disclosure described above, the thermally conductive material contains the base resin and the filler, the filler contains the thermally conductive filler and the hollow filler composed of the particles including the gas layer, the content of the filler is 20.0% by volume or more and 90.0% by volume or less based on the total material amount, and the content of the hollow filler is 25.0% by volume or more and 70.0% by volume or less based on the total amount of the filler. Thus, heat dissipation and weight saving can be combined.

The thermally conductive material of the present disclosure can be used in various members required to have heat dissipation. The thermally conductive material of the present disclosure can be, for example, used as an insulating member required to have heat dissipation. Examples of the insulating member required to have heat dissipation include an insulation coating of an insulated wire, an insulation tape used in wiring a wiring harness or the like, an exterior material such as a protection tube used in wiring an insulated wire, a wiring harness or the like, a heat dissipation material to be arranged between an insulated wire or wiring harness and an exterior material, an adhesive used to bond and stop water between members, and a connector housing.

The thermally conductive material of the present disclosure can be particularly suitably used as a heat dissipation material to be arranged between an insulated wire and an exterior material.

Next, an example of a wiring harness of the present disclosure is described. The wiring harness of the present disclosure includes an insulated wire composed of an insulation coating and a conductor, an exterior material in which the insulated wire is inserted, and a heat dissipation material to be arranged between the insulated wire and the exterior material. The heat dissipation material is made of the thermally conductive material of the present disclosure.

The wiring harness of the present disclosure is not particularly limited, but is suitable as a high voltage cable for connecting between a power control unit (PCU) and a battery arranged in an electric or hybrid vehicle.

Figure 1:
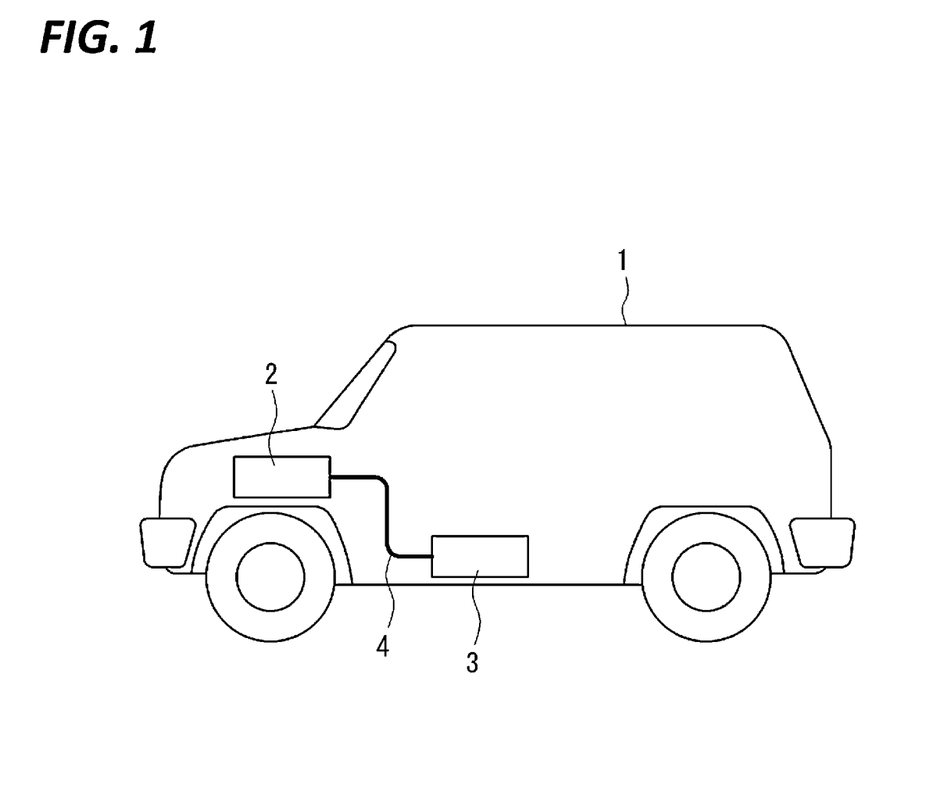
FIG. 1 is a diagram of a vehicle in which a wiring harness of the present disclosure is wired.
Figure 2:
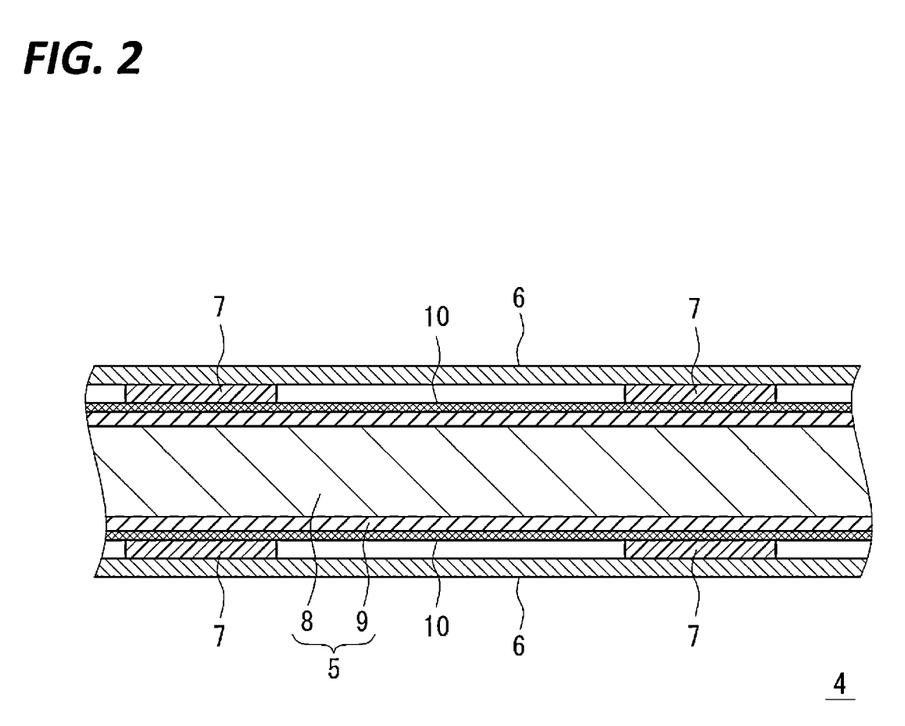
FIG. 2 is a section of the wiring harness of the present disclosure in an extending direction.
Figure 3:
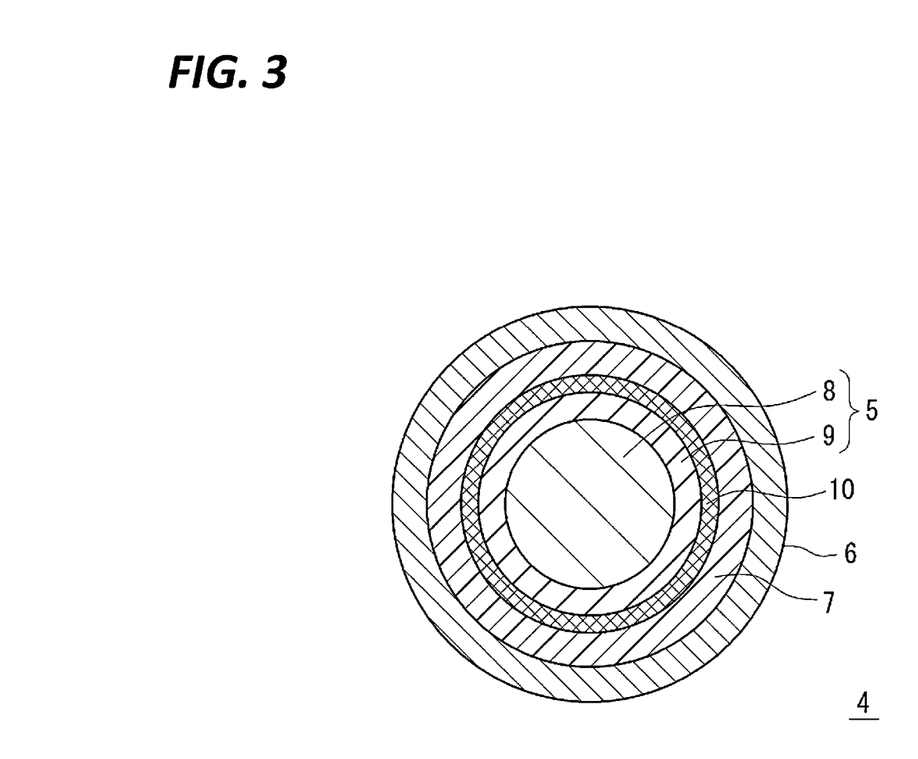
FIG. 3 is a section of the wiring harness of the present disclosure in a radial direction.

FIG. 1 is a diagram of a vehicle in which the wiring harness of the present disclosure is wired. FIGS. 2 and 3 show a wiring harness according to one embodiment of the present disclosure, wherein FIG. 2 is a section of the wiring harness in an extending direction and FIG. 3 is a section of the wiring harness in a radial direction.

An electric vehicle is shown as the vehicle in FIG. 1. The electric vehicle 1 is a vehicle to be driven using an unillustrated motor as a power source. Power is supplied from a battery 3 to the motor via a power control unit 2. The power control unit 2 is installed on a front side of the vehicle interior where the motor is arranged. The battery 3 is installed on a rear side of the vehicle interior. Note that the arrangement of the power control unit 2 and the battery 3 is an example and is not limited to this. The power control unit 2 and the battery 3 are connected by a wiring harness 4.

The wiring harness 4 according to the embodiment of the present disclosure includes an insulated wire 5, an exterior material 6 in which the insulated wire 5 is inserted, and heat dissipation materials 7. The insulated wire 5 includes a conductor 8 and an insulation coating 9 covering the outer periphery of the conductor 8. The conductor 8 has a circular cross-section. A shield member 10 made of metal is arranged around the insulated wire 5. The shield member 10 is constituted by a braided wire formed by braiding metal thin wires into a mesh, a metal foil or the like. The electromagnetic interference of the insulated wire 5 with an external environment is suppressed by the shield member 10.

The conductor 8 is made of metal excellent in electrical conductivity such as copper, copper alloy, aluminum or aluminum alloy. The conductor 8 may be a single wire or may be constituted by a bundle of a plurality of metal strands. A conductor cross-sectional area is not particularly limited, but is preferably 90 mm$^2$ or less in terms of weight saving and the like.

Rubber, polyolefin, PVC, thermoplastic elastomer and the like can be, for example, cited as a material of the insulation coating 9. These may be singly used or two or more kinds may be blended and used. Various additives may be appropriately added in the material of the insulation coating 9. A flame retardant, a filler, a colorant and the like can be cited as the additive.

The exterior material 6 is a hollow cylindrical member and continuously or discontinuously covers the insulated wire 5 along a longitudinal direction to suppress the contact of the insulated wire 5 with an external environment and protect the insulated wire 5. Tubular pipes having a hollow cylindrical shape, a rectangular tube shape and other tubular shapes, corrugated tubes and the like can be cited as such a member. The corrugated tube is a tube having a concave and convex wavy shape along a longitudinal direction (bellows-like tube), has rigidity based on a material and flexibility based on a shape, and is easily bent and routed.

The exterior material 6 is formed of a resin material or rubber material. The exterior material 6 is preferably formed of a resin material in terms of excellent rigidity, an excellent function of protecting the insulated wire 5 from contact with the external environment, and the like. Examples of the resin material include polyolefin-based resins such as polypropylene and polyethylene, copolymers of those, and polyamide, polyester and fluororesin. Out of these, polypropylene is more preferable in terms of excellent heat resistance, excellent rigidity, elongation and easy injection molding. Examples of the rubber material include ethylene-propylene-diene rubber (EPDM), butadiene rubber, isoprene rubber and natural rubber.

The heat dissipation material 7 is made of the thermally conductive material of the present disclosure and arranged between the insulated wire 5 and the exterior material 6, in which the insulated wire 5 is inserted. The heat dissipation material 7 is molded into a hollow cylindrical shape, the inner peripheral surface of the heat dissipation material 7 is in contact with the outer peripheral surface of the insulated wire 5 over an entire circumference, and the outer peripheral surface of the heat dissipation material 7 is in contact with the inner peripheral surface of the exterior material 6 over an entire circumference. A plurality of the heat dissipation materials 7 are provided at predetermined intervals in an extending direction of the insulated wire 5. Since an air layer is formed as small as possible between the insulated wire 5 and the exterior material 6 in parts where the heat dissipation materials 7 are arranged, heat generated in the insulated wire 5 is efficiently transferred to the exterior material 6 via the heat dissipation materials 7 and a heat dissipation effect is excellent.

The heat dissipation material 7 may be molded into a sheet shape or tube shape. The sheet shape is a shape having end parts in the longitudinal direction, and the tube shape is a shape having no end part in the longitudinal direction and tubular. The heat dissipation material 7 can be arranged, for example, by winding a sheet-like material on the outer peripheral surface of the insulated wire 5 to have a predetermined thickness. Further, the heat dissipation material 7 having a tube shape can be arranged by inserting the insulated wire 5 inside.

Although the embodiment of the present disclosure has been described in detail above, the present disclosure is not limited to the above embodiment at all and various changes can be made without departing from the gist of the present disclosure.

For example, although the plurality of heat dissipation materials 7 are provided at predetermined intervals in the extending direction of the insulated wire 5 in the above embodiment, a heat dissipation material 7 may be provided continuously over an entire length in the extending direction of the insulated wire 5. Further, although the conductor 8 has a circular cross-sectional shape in the above embodiment, the cross-sectional shape of the conductor 8 is not limited to the circular cross-sectional shape and may be one of various shapes such as an oval cross-sectional shape and a rectangular cross-sectional shape. Further, although the exterior material 6 has a hollow cylindrical shape in the above embodiment, the shape of the exterior material 6 is not limited to the hollow cylindrical shape and may be one of various shapes such as a rectangular tube shape. Further, although the heat dissipation material 7 has a hollow cylindrical shape in the above embodiment, the shape of the heat dissipation material 7 is not limited to the hollow cylindrical shape and may be one of various shapes such as a rectangular tube shape. Further, although the insulated wire 5 is covered with the shield member 10 in the above embodiment, the insulated wire 5 may be a general wire not covered with the shield member 10. Further, although one insulated wire 5 is inserted in the exterior material 6 in the above embodiment, two or more insulated wires may be inserted in the exterior material 6.

EXAMPLES

The present disclosure is described by way of examples below, but the present disclosure is not limited by the examples.

Figure 4:
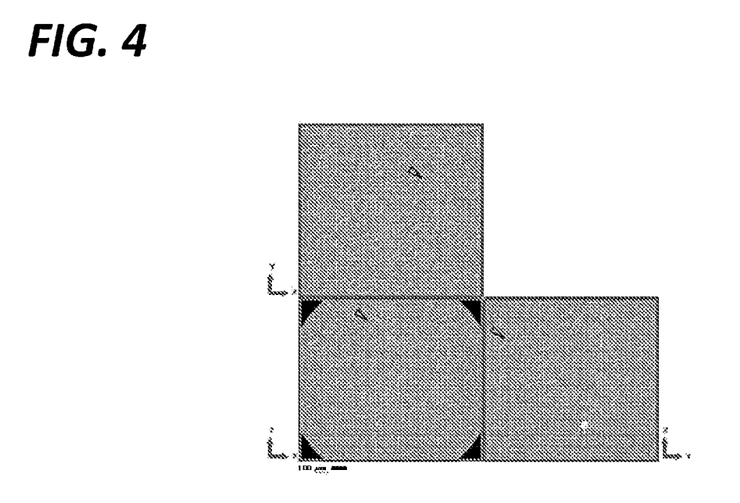
FIG. 4 shows a three-screen image showing an internal structure state of a specimen 2.
Figure 5:
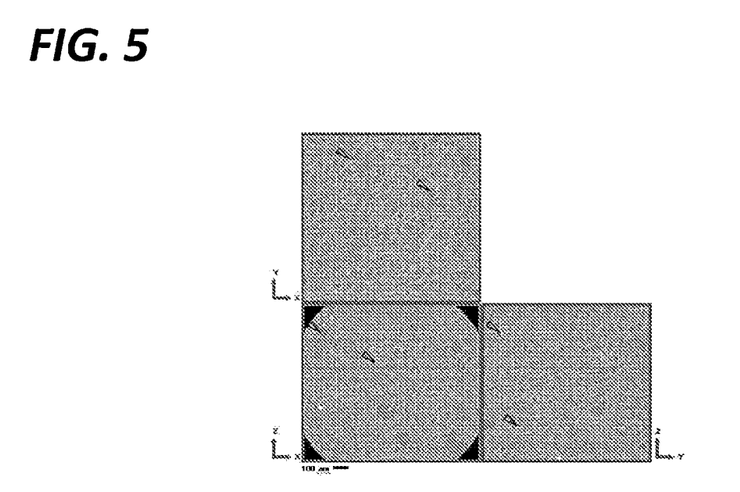
FIG. 5 shows a three-screen image showing an internal structure state of a specimen 4.

(Preparation of Specimens)
Each specimen was prepared by blending respective components in a blending composition (% by volume) written in Tables.
(Fabrication of Thermally Conductive Materials)
Thermally conductive materials were fabricated by curing the prepared specimens.
Materials used in the fabrication of the thermally conductive materials are as follows.
(Base Resin)
Silicone (polydimethyl siloxane): "KE-1886" produced by Shin-Etsu Chemical Co., Ltd.
(Thermally Conductive Filler)
Carbon fiber: "XN-100-15M" produced by Nippon Graphite Fiber Co., Ltd. and having a fiber diameter (average fiber diameter) of 13 μm and a fiber length (average fiber length) of 150 μm
Graphite carbon: "Denka Black (particulate product)" produced by Denka Company Limited and having a particle diameter (median diameter) of 35 nm
Alumina<1 (spherical): "BAK-90" produced by Airbrown Co., Ltd. and having a particle diameter (median diameter) of 90 μm
Alumina<2>(spherical): "BAK-120" produced by Airbrown Co., Ltd. and having a particle diameter (median diameter) of 120 μm
Alumina<3>(spherical): "AS-50" produced by Showa Denko K.K. and having a particle diameter (median diameter) of 9 μm
Alumina<4>(spherical): "CB-A100S" produced by Showa Denko K.K. and having a particle diameter (median diameter) of 100 μm
(Hollow Filler)
Glass hollow spheres: "K1" produced by 3M and having a particle diameter (median diameter) of 65 μm
(Specific Weight)
Measured at a room temperature in accordance with JIS K5400.
(Thermal Conductivity Rate)
Measured at a room temperature in accordance with JIS A1412. Samples having a disk shape (a diameter of 50 mm, a thickness of 2 mm+0.2 mm) were used.
Internal structure states of the thermally conductive materials were observed for a specimen 2 (Comparative Example 2) and a specimen 4 (Example 2), using an X-ray CT device. A result is shown in FIGS. 4 and 5.

TABLE 1

|  |  | C. EX 1 Spec. 1 | C. EX. 2 Spec. 2 | EX. 1 Spec. 3 | EX. 2 Spec. 4 |
|---|---|---|---|---|---|
| Base resin | Silicone | 100 | 81.7 | 73.2 | 59.0 |
| Thermally conductive filler | Carbon fiber (fiber length of 150 μm) | — | 18.4 | 18.2 | 18.1 |
|  | Graphite carbon (35 nm) | — | — | — | — |
|  | Alumina<1> (90 μm) | — | — | — | — |
|  | Alumina<2> (120 μm) | — | — | — | — |
|  | Alumina<3> (9 μm) | — | — | — | — |
|  | Alumina<4> (100 μm) | — | — | — | — |
| Hollow filler | Glass hollow spheres (65 μm) | — | — | 8.6 | 22.9 |
| Filler content (based on total material amount, % by volume) |  | — | 18.4% | 26.8% | 41.0% |
| Hollow filler content (based on total filler amount, % by volume) |  | — | 0% | 32.0% | 55.9% |
| Evaluation | Specific weight | 0.96 | 1.19 | 1.10 | 0.96 |
|  | Thermal conductivity rate (W/m · K) | 0.14 | 0.51 | 0.49 | 0.52 |

TABLE 2

|  |  | C. EX 1 Spec. 1 | C. EX. 3 Spec. 5 | EX. 3 Spec. 6 | EX. 4 Spec. 7 |
|---|---|---|---|---|---|
| Base resin | Silicone | 100 | 81.7 | 70.8 | 52.6 |
| Thermally conductive filler | Carbon fiber (fiber length of 150 μm) | — | — | — | — |
|  | Graphite carbon (35 nm) | — | — | — | — |
|  | Alumina<1> (90 μm) | — | 18.3 | 18.3 | 18.2 |
|  | Alumina<2> (120 μm) | — | — | — | — |
|  | Alumina<3> (9 μm) | — | — | — | — |
|  | Alumina<4> (100 μm) | — | — | — | — |
| Hollow filler | Glass hollow spheres (65 μm) | — | — | 10.9 | 29.2 |
| Filler content (based on total material amount, % by volume) |  | — | — | 29.2% | 47.4% |
| Hollow filler content (based on total filler amount, % by volume) |  | — | — | 37.3% | 61.6% |
| Evaluation | Specific weight | 0.96 | 1.51 | 1.40 | 1.23 |
|  | Thermal conductivity rate (W/m · K) | 0.14 | 0.35 | 0.34 | 0.48 |

TABLE 3

|  |  | C. EX 1 Spec. 1 | C. EX. 4 Spec. 8 | EX. 5 Spec. 9 | EX. 6 Spec. 10 |
|---|---|---|---|---|---|
| Base resin | Silicone | 100 | 81.6 | 71.6 | 55.4 |
| Thermally conductive filler | Carbon fiber (fiber length of 150 μm) | — | 9.2 | 9.3 | 9.3 |
|  | Graphite carbon (35 nm) | — | — | — | — |
|  | Alumina<1> (90 μm) | — | 9.2 | 9.3 | 9.2 |
|  | Alumina<2> (120 μm) | — | — | — | — |
|  | Alumina<3> (9 μm) | — | — | — | — |
|  | Alumina<4> (100 μm) | — | — | — | — |
| Hollow filler | Glass hollow spheres (65 μm) | — | — | 9.8 | 26.1 |
| Filler content (based on total material amount, % by volume) |  | — | — | 28.4% | 44.6% |
| Hollow filler content (based on total filler amount, % by volume) |  | — | — | 34.5% | 58.6% |
| Evaluation | Specific weight | 0.96 | 1.35 | 1.26 | 1.10 |
|  | Thermal conductivity rate (W/m · K) | 0.14 | 0.73 | 0.48 | 0.52 |

TABLE 4

|  |  | C. EX 1 Spec. 1 | EX. 3 Spec. 6 | EX. 5 Spec. 9 | EX. 1 Spec. 3 | EX. 4 Spec. 7 | EX. 6 Spec. 10 | EX. 2 Spec. 4 |
|---|---|---|---|---|---|---|---|---|
| Base resin | Silicone | 100 | 70.8 | 71.6 | 73.2 | 52.6 | 55.4 | 59.0 |
| Thermally conductive filler | Carbon fiber (fiber length of 150 μm) | — | — | 9.3 | 18.2 | — | 9.3 | 18.1 |
|  | Graphite carbon (35 nm) | — | — | — | — | — | — | — |
|  | Alumina<1> (90 μm) | — | — | 9.3 | — | 18.2 | 9.2 | — |
|  | Alumina<2> (120 μm) | — | — | — | — | — | — | — |
|  | Alumina<3> (9 μm) | — | 18.3 | — | — | — | — | — |
|  | Alumina<4> (100 μm) | — | — | — | — | — | — | — |
| Hollow filler | Glass hollow spheres (65 μm) | — | 10.9 | 9.8 | 8.6 | 29.2 | 26.1 | 22.9 |
| Filler content (based on total material amount, % by volume) |  | — | 29.2% | 28.4% | 26.8% | 47.4% | 44.6% | 41.0% |
| Hollow filler content (based on total filler amount, % by volume) |  | — | 37% | 34.5% | 32.0% | 61.6% | 58.6% | 55.9% |
| Evaluation | Specific weight | 0.96 | 1.40 | 1.26 | 1.10 | 1.23 | 1.10 | 0.96 |
|  | Thermal conductivity rate (W/m · K) | 0.14 | 0.38 | 0.48 | 0.49 | 0.48 | 0.52 | 0.52 |

TABLE 5

|  |  | C. EX 1 Spec. 1 | EX. 1 Spec. 3 | EX. 2 Spec. 4 | EX. 7 Spec. 11 | EX. 8 Spec. 12 | EX. 9 Spec. 13 | EX. 10 Spec. 14 |
|---|---|---|---|---|---|---|---|---|
| Base resin | Silicone | 100 | 73.2 | 59.0 | 35.8 | 35.5 | 15.2 | 24.7 |
| Thermally conductive filler | Carbon fiber (fiber length of 150 μm) | — | 18.2 | 18.1 | 36.2 | 39.6 | 59.6 | 25.2 |
|  | Graphite carbon (35 nm) | — | — | — | — | — | — | — |
|  | Alumina<1> (90 μm) | — | — | — | — | — | — | — |
|  | Alumina<2> (120 μm) | — | — | — | — | — | — | — |
|  | Alumina<3> (9 μm) | — | — | — | — | — | — | — |
|  | Alumina<4> (100 μm) | — | — | — | — | — | — | — |
| Hollow filler | Glass hollow spheres (65 μm) | — | 8.6 | 22.9 | 28.0 | 24.9 | 25.2 | 50.1 |
| Filler content (based on total material amount, % by volume) |  | — | 26.8% | 41.0% | 64.2% | 64.5% | 84.8% | 75.3% |
| Hollow filler content (based on total filler amount, % by volume) |  | — | 32.0% | 55.9% | 43.6% | 38.6% | 29.7% | 66.5% |
| Evaluation | Specific weight | 0.96 | 1.10 | 0.96 | 1.18 | 1.24 | 1.49 | 0.86 |
|  | Thermal conductivity rate (W/m · K) | 0.14 | 0.49 | 0.52 | 1.80 | 2.68 | 1.40 | 0.91 |

FIG. 4 shows a reconstructed cross-section image (three-plane drawing) of an internal structure state of the thermally conductive material of the specimen 2 (Comparative Example 2). As shown in FIG. 4, in the specimen 2 (Comparative Example 2), the carbon fiber can be confirmed inside the silicone of the base resin (parts represented by triangles in FIG. 4). FIG. 5 shows a reconstructed cross-section image (three-plane drawing) of an internal structure state of the thermally conductive material of the specimen 4 (Comparative Example 2). As shown in FIG. 5, in the specimen 4 (Comparative Example 2), the carbon fiber and hollow particles can be confirmed inside the silicone of the base resin (parts represented by triangles in FIG. 5).

From Table 1, if the thermally conductive filler (carbon fiber) is blended with the base resin without blending the hollow filler (Comparative Example 2), the thermal conductivity of the material increases as compared to the base resin (Comparative Example 1), but the specific weight of the material also increases. On the other hand, if the hollow filler is blended with the base resin together with the thermally conductive filler at a predetermined blending ratio (Example 1, Example 2), an increase in the specific weight of the material is suppressed while the thermal conductivity of the material is increased. Similarly, from Table 2, if the thermally conductive filler (alumina) is blended with the base resin without blending the hollow filler (Comparative Example 3), the thermal conductivity of the material increases as compared to the base resin (Comparative Example 1), but the specific weight of the material also increases. On the other hand, if the hollow filler is blended with the base resin together with the thermally conductive filler at a predetermined blending ratio (Example 3, Example 4), an increase in the specific weight of the material is suppressed while the thermal conductivity of the material is increased. Similarly, from Table 3, if the thermally conductive filler (carbon fiber and alumina) is blended with the base resin without blending the hollow filler (Comparative Example 4), the thermal conductivity of the material increases as compared to the base resin (Comparative Example 1), but the specific weight of the material also increases. On the other hand, if the hollow filler is blended with the base resin together with the thermally conductive filler at a predetermined blending ratio (Example 5, Example 6), an increase in the specific weight of the material is suppressed while the thermal conductivity of the material is increased. Therefore, according to the thermally conductive material of the present disclosure, heat dissipation and weight saving can be combined.

According to Table 4, from a comparison of Example 3, Example 5 and Example 1, the specific weight is smaller and the thermal conductivity rate is better when the alumina particles and the carbon fiber are used as the thermally conductive filler than when the alumina particles are used as the thermally conductive filler under the condition that a volume ratio of the thermally conductive filler and that of the hollow filler are equal. Further, the specific weight is smaller and the thermal conductivity rate is better when the carbon fiber is used than when the alumina particles and the carbon fiber are used. The same holds true also in a comparison of Example 4, Example 6 and Example 2.

According to Table 5, if the volume ratio of the thermally conductive filler is 20.0% by volume or more based on the total amount of the thermally conductive material, the thermal conductivity rate is better. Further, if the volume ratio of the thermally conductive filler is 30.0% by volume or more, the thermal conductivity rate exceeds 1.00 W/m·K and is particularly excellent. If the volume ratio of the hollow filler is 20.0% by volume or more based on the total amount of the thermally conductive material, the specific weight can be further reduced.

Although the embodiment of the present disclosure has been described in detail above, the present disclosure is not limited to the above embodiment at all and various changes can be made without departing from the gist of the present disclosure.

LIST OF REFERENCE NUMERALS 1 electric vehicle
2 power control unit
3 battery
4 wiring harness
5 insulated wire
6 exterior material
7 heat dissipation material
8 conductor
9 insulation coating
10 shield member

What is claimed is:

1. A thermally conductive material, comprising a base resin and a filler, wherein:
  the filler contains a thermally conductive filler containing a fibrous filler and a particulate filler having one, two or more kinds of shapes selected from a group composed of an indefinite shape, a spherical shape and an oval shape, and a hollow filler composed of glass particles including a gas layer in a closed part therein,
  a content of the filler is 20.0% by volume or more and 90.0% by volume or less based on a total material amount,
  a content of the hollow filler is 25.0% by volume or more and 70.0% by volume or less based on a total amount of the filler, and
  a median diameter d50 of the hollow filler is 50 μm or more and 80 μm or less.

2. The thermally conductive material of claim 1, wherein the fibrous filler is a carbon fiber.

3. The thermally conductive material of claim 1, wherein a fiber length of the fibrous filler is 50 μm or more and 300 μm or less.

4. The thermally conductive material of claim 1, wherein the particulate filler is composed of alumina particles.

5. The thermally conductive material of claim 1, wherein the hollow filler has a spherical shape.

6. A wiring harness, comprising:
  an insulated wire composed of an insulation coating and a conductor;
  an exterior material, the insulated wire being inserted in the exterior material, and
  a heat dissipation material to be arranged between the insulated wire and the exterior material,
  the heat dissipation material being made of the thermally conductive material of claim 1.

7. The wiring harness of claim 6, wherein the wiring harness is a high voltage cable that connects between a power controller and a battery.

8. The wiring harness of claim 7, wherein the high voltage cable is for an electric vehicle.

9. The thermally conductive material of claim 1, wherein a fiber diameter of the fibrous filler is 5 μm or more and 20 μm or less.

10. The thermally conductive material of claim 1, wherein an aspect ratio of the fibrous filler is 9 or more and 30 or less.

11. The thermally conductive material of claim 1, wherein the gas layer includes at least one of air, nitrogen gas, argon gas, and hydrocarbon gas.

12. The thermally conductive material of claim 1, wherein a specific weight of the thermally conductive material is below 1.50.

13. The thermally conductive material of claim 1, wherein a thermal conductivity rate of the thermally conductive material is 0.50 W/m·K or more.

14. The thermally conductive material of claim 1, wherein a content of the thermally conductive filler is 30.0% by volume or more and 60.0% by volume or less based on the total material amount.

15. A wiring harness, comprising:
   an insulated wire composed of an insulation coating and a conductor;
   an exterior material, the insulated wire being inserted in the exterior material; and
   a heat dissipation material made of a thermally conductive material and to be arranged between the insulated wire and the exterior material,
   wherein:
   the thermally conductive material contains a base resin and a filler,
   the filler contains a thermally conductive filler and a hollow filler composed of particles including a gas layer in a closed part therein,
   a content of the filler is 20.0% by volume or more and 90.0% by volume or less based on a total material amount,
   a content of the hollow filler is 25.0% by volume or more and 70.0% by volume or less based on a total amount of the filler, and
   a median diameter d50 of the hollow filler is 50 μm or more and 80 μm or less.

* * * * *